US006259476B1

(12) United States Patent
Greene

(10) Patent No.: US 6,259,476 B1

(45) Date of Patent: Jul. 10, 2001

(54) LIGHTING FIXUTRE WITH A COVERT SECURITY CAMERA

(76) Inventor: Kenneth L. Greene, 7200 New Horizons Blvd., N. Amityville, NY (US) 11701

(*) Notice: Subject to any disclaimer, the term of this patent is extended or adjusted under 35 U.S.C. 154(b) by 0 days.

(21) Appl. No.: 09/146,066

(22) Filed: Sep. 2, 1998

(51) Int. Cl.[7] ........ H04N 7/18

(52) U.S. Cl. ........ 348/151; 348/143; 348/156

(58) Field of Search ........ 348/143, 151, 348/156, 214

(56) References Cited

U.S. PATENT DOCUMENTS

| | | | | |
|---|---|---|---|---|
| 3,993,866 | * | 11/1976 | Pearl | 348/151 |
| 4,225,881 | * | 9/1980 | Tovi | 348/151 |
| 4,901,146 | * | 2/1990 | Struhs et al. | 348/151 |
| 4,920,367 | * | 4/1990 | Pagano | 348/151 |
| 5,689,304 | * | 11/1997 | Jones et al. | 348/373 |
| 5,886,738 | * | 3/1999 | Hollenbeck et al. | 348/151 |
| 5,946,404 | * | 8/1999 | Bakshi et al. | 348/151 |

* cited by examiner

*Primary Examiner*—Andy Rao

(74) *Attorney, Agent, or Firm*—Myron Amer PC

(57) ABSTRACT

A lighting fixture, primarily for outdoor use in providing light along a park path or the like, improved in a combination with a security camera in that the security camera has a desired covert location within the lighting fixture and the heat of the source of illumination is used to advantage to prevent a freeze-up and consequent malfunctioning of the security camera as might occur due to severe weather conditions.

1 Claim, 1 Drawing Sheet

LIGHTING FIXUTRE WITH A COVERT SECURITY CAMERA

The present invention relates generally to an improved two-component assemblage of an outdoor lighting fixture and a security camera, in which the utility of each component is significantly enhanced in effectuating the assemblage. For the lighting fixture, in addition to providing illumination of a selected area, its operating mode includes security surveillance thereof, and for the security camera, the housing of the lighting fixture provides a covert location for its vantage position at said selected area.

EXAMPLE OF THE PRIOR ART

U.S. Pat. No. 3,732,368 issued to Salim S. Mahlab for "Surveillance Unit For Scanning An Area Under Surveillance" discloses a light source, i.e. searchlight 25, and security camera, i.e. T.V. camera 9, in an aggregate relation, as per MPEP 2173.05(k), in that the cooperation therebetween is limited to the illumination of the area under surveillance of the security camera that is provided by the light source.

All other known patents of a lighting fixture, particularly for outdoor use, and an accompanying security camera, disclose minimal cooperation therebeteween which significantly contributes to the effectiveness of either one or both of the noted components.

Broadly, it is an object of the present invention to provide a combination outdoor lighting fixture and security camera overcoming the foregoing and other shortcomings of the prior art.

More particularly, it is an object to provide, as a result of combination, a by-product source of heat from the illumination of the light source which is used to advantage to obviate malfunctioning of the security camera, as well as providing other benefits, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
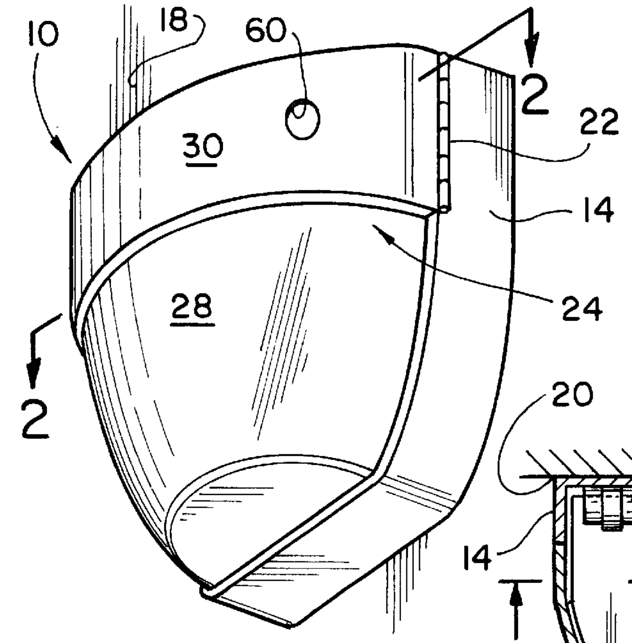
FIG. 1 is a perspective view of the within inventive combination lighting fixture and security camera.

Disclosed is an outdoor lighting fixture, generally designated 10, of the type used in a supported position on a support wall at a front entrance to an apartment building (not shown) or on poles along park paths, and in other such circumstances, to provide during the night or during other conditions of diminished visibility enough additional light or illumination to contribute to safety and convenience in the use of the area being serviced by the one or more lighting fixtures 10.

By common experience it is known that a lighting fixture 10 is often used, for security reasons, in conjunction with a camera which records, for example, those individuals entering or leaving the apartment building entrance. In this co-joint use of a security camera, herein generally designated 12, and lighting fixture 10, the patentable advance is the recognition that heat transmission from the lighting fixture 10 to the security camera 12 contributes to a more efficient operation of the latter, particularly during winter and frigid weather conditions and, advantageous use is made of the lighting fixture 10 to provide a desirable covert location, i.e. within the lighting fixture 10, for the security camera 12 to contribute to its intended purpose, discourage vandalism, and provide other benefits, all as will be better understood as the description proceeds.

Lighting fixture 10 has a rear bracket 14 with a front opening 16 mounted appropriately to a support wall 18, as at 20. Disposed in the opening 16 and pivotally traversable about a hinge 22 of bracket 14 and also stationary in said opening 16 is a two-part lighting housing, generally designated 24, which cooperates with bracket 14 to bound an internal compartment 26 between the interior surface of the lighting housing 24 and the bracket 14.

One part of lighting housing 24 is a lower stationary, as noted, spherically shaped member 28 serving as a lens and of light-transmitting construction material, and an upper pivotally traversable, as noted, closure 30 for compartment 26 of opaque construction material.

Figure 3:
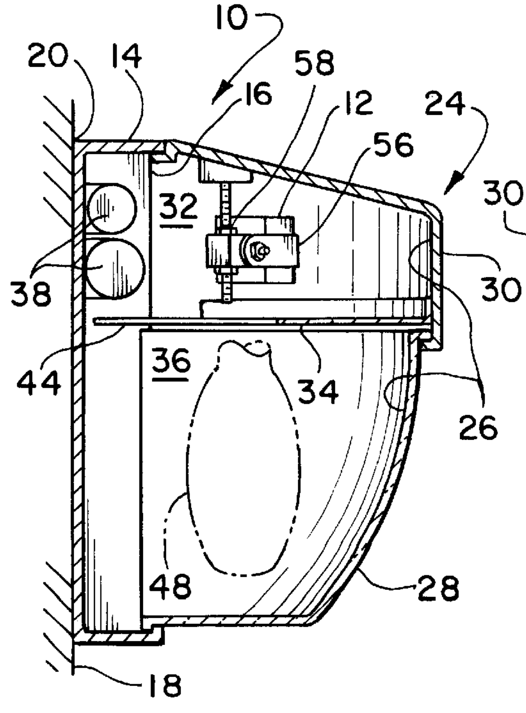
FIG. 3 is a vertical sectional view taken along line 3—3 of FIG. 2.
Figure 4:
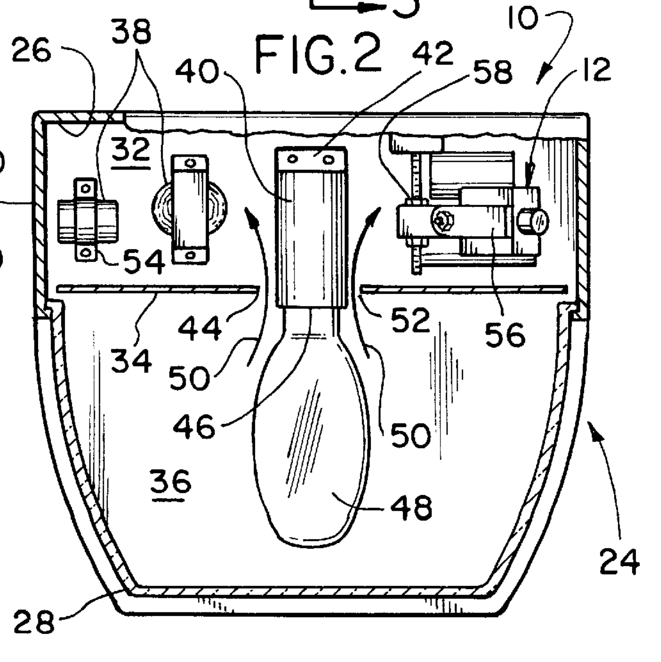
FIG. 4 is another vertical sectional view taken along line 4—4 of FIG. 2.

Compartment 26 is divided into an upper sub-compartment 32, as best understood from FIG. 3, by a partitioning panel 34 of non-conductive construction material, and a lower sub-compartment 36, in which the upper sub-compartment 32 is rearwardly of the opaque closure 30 and the lower sub-compartment 36 is rearwardly of the light-transmitting lens 28. Thus, what will be understood to be security camera components, individually and collectively designated 38, for operating the security camera 12 per se (wiring having been omitted for simplicity) appropriately mounted in upper compartment 32 are in a desirable covert location to an individual observing the lighting fixture 10.

Figure 2:
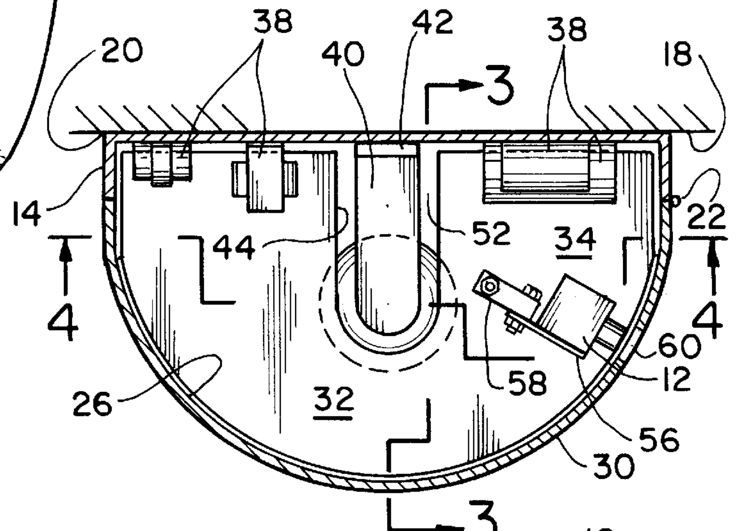
FIG. 2 is a horizontal sectional view taken along line 2—2 of FIG. 1.

The lighting fixture 10 components, specifically its lamp base 40 extends in depending relation from a bracket mounting means 42 through a U-shaped notch 44 (FIG. 2) in the partitioning panel 34 into the lower compartment 36 and is electrically operationally and physically interconnected, as at 46, to a source of illumination 48, which preferably is a metal halide lamp having an operating temperature between 10 degrees to 50 degrees centigrade. In practice, it has been found that the generated heat by-product of the illumination provided by the lamp 48 heats the air within the lower sub-compartment 36 which rises, as noted by the arrows 50, through the clearance 52 of the notch 44 into the sub-compartment 32 housing the security camera and parts 12, 38, and is of an extent to significantly obviate malfunctioning of the security camera 12.

For completeness' sake it is noted that the camera components 38 are held in place by straps 54, that the camera 12 is mounted, as at 56, to a support post with an adjustable linkage 58 to orient the camera vertically and horizontally relative to a camera port 60 (see FIG. 1), and that the partition panel 34 is preferably mounted to, and moveable, with the upper closure 30.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A combination lighting fixture and a security camera wherein said lighting fixture comprises an exterior housing wall partially of light-transmitting construction material in a bottom location and opaque construction material in a top location with said housing wall bounding therebehind a housing interior compartment, a cooperating electric current-transmitting means and electric current-operated illumination means operatively electrically and physically interconnected to each other disposed in said interior compartment with said electric current-operated illumination means in a rearward clearance position from said light-transmitting construction material and said electric current-transmitting means in a rearward clearance position from said opaque construction material, a partitioning panel of non-conductive construction material having a U-shape configuration having edges bounding a correspondingly U-shape notch therein disposed so as to subdivide said interior compartment into a lower compartment occupied by said electric current-operated illumination means projected through said partition panel notch to one side of said partition panel and into an upper compartment occupied by said electric current-transmitting means projected to an opposite side of said partition panel and behind said opaque construction material, and a security camera positioned in said upper subdivided compartment, whereby said lighting fixture contributes to providing said security camera with a covert location to a viewer and also heat transmitted from said electric current-operated illumination means through said partition panel notch into said subdivided top compartment to facilitate the operation of said security camera therein.

* * * * *